United States Patent Office 3,761,352
Patented Sept. 25, 1973

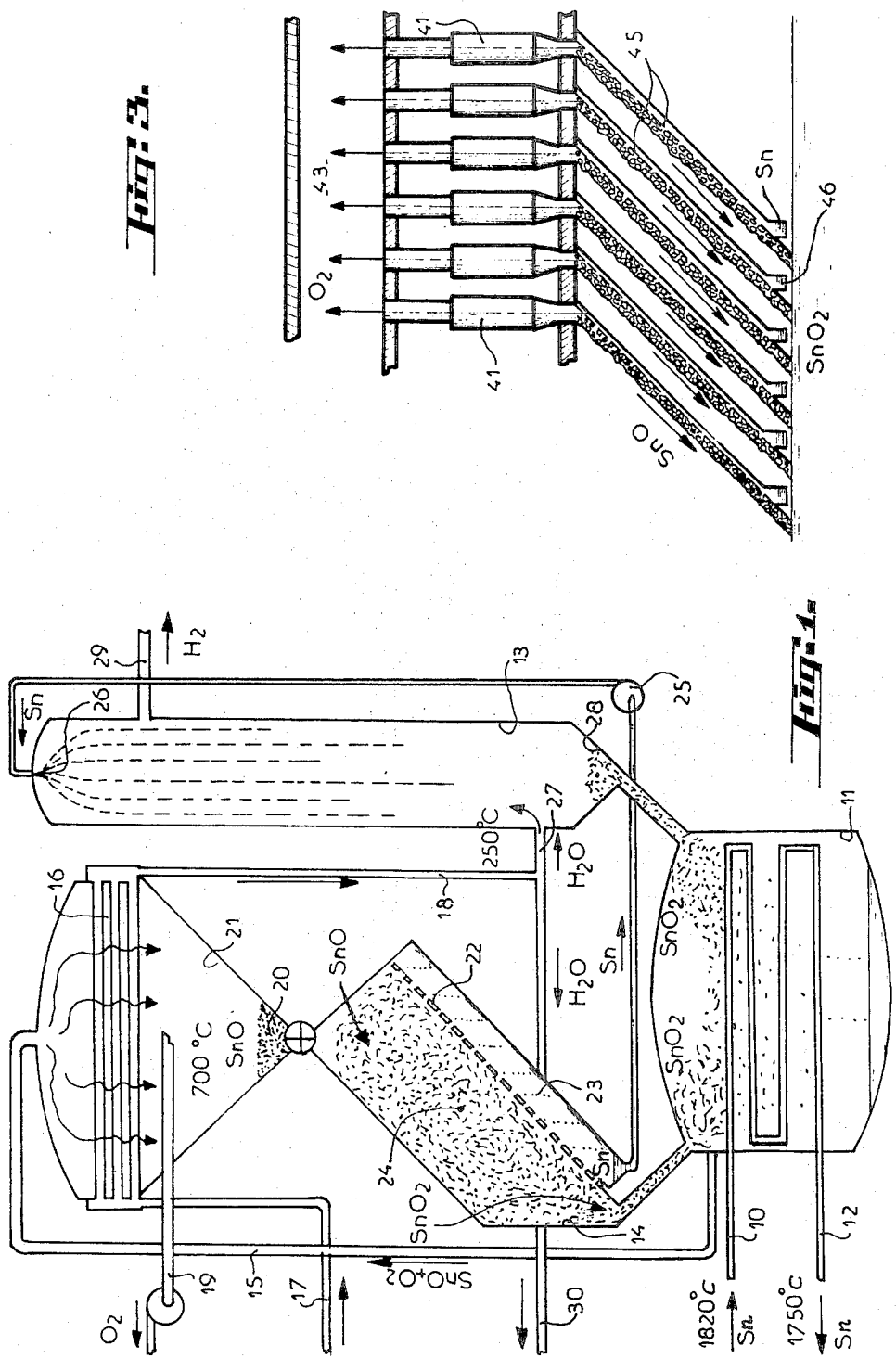

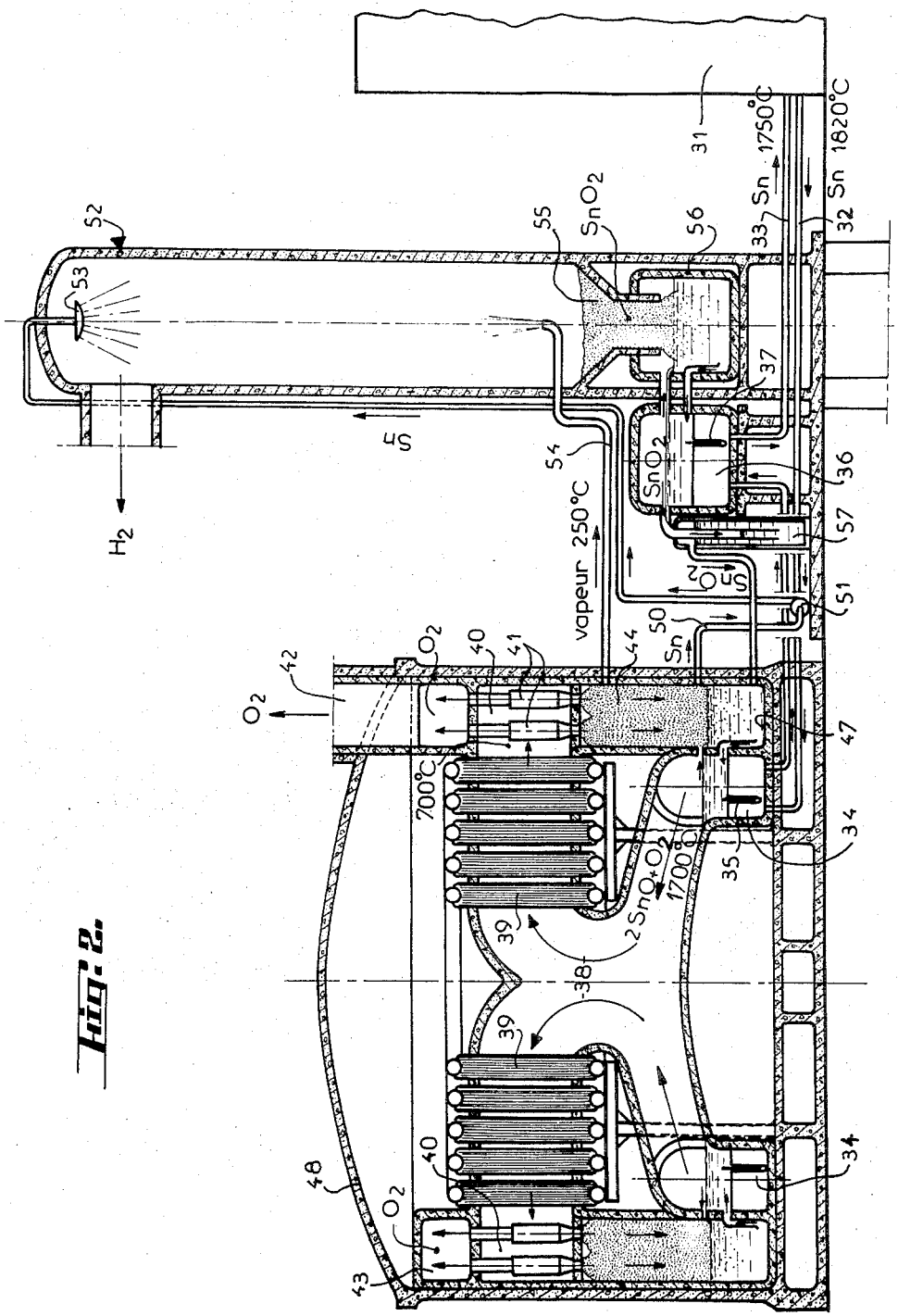

3,761,352
METHOD AND DEVICE FOR THE USE OF HIGH-TEMPERATURE HEAT-ENERGY, IN PARTICULAR OF NUCLEAR ORIGIN
Daniel Souriau, Paris, France, assignor to Gaz de France, Paris, France
Filed May 18, 1972, Ser. No. 254,755
Int. Cl. G21d 9/00
U.S. Cl. 176—57                                   11 Claims

ABSTRACT OF THE DISCLOSURE

The invention relates to the recovering of the high-temperature heat-energy dissipated in the core of a nuclear reactor and using a tin cycle in which stannic oxide ($SnO_2$) is decomposed at high temperature into a gaseous mixture of stannous oxide (SnO) and oxygen ($O_2$) which, after cooling, gives solid stannous oxide (SnO) and oxygen. Then stannous oxide is allowed to dismute into stannic oxide ($SnO_2$) which is recycled and into tin which is used to decompose water steam ($H_2O$) into ($H_2$) and into amine oxide ($SnO_2$) which is recycled.

---

The present invention has essentially for its object a method and a device enabling the high-temperature heat-energy dissipated. for instance, in a nuclear reactor, to be used through recovery and conversion.

In most of the plants worked or designed at the present time, the high-temperature heat-energy produced in the core of a nuclear reactor is extracted by means of an exchange fluid such as for instance water, helium or sodium. The exchange fluid sometimes works directly in turbines. More often, it constitutes the hot source of a conventional thermodynamic cycle using, in particular, turbines and water boilers.

The efficiency of such cycles is not very high and, moreover, investment expenditure for the plants, in particular for the turbine-boiler unit, heavily burdens the cost of every kilowatt-hour produced.

The invention is directed at reducing the cost of the recoverable energy and at producing simultaneously interesting and valuable chemical bodies such as hydrogen and oxygen.

The method of the invention is characterized notably in that it consists in using the high-temperature heat-energy released in the reactor to melt stannic oxide ($SnO_2$), e.g. at about 1700° C., in letting the latter decompose into a gaseous mixture of stannous oxide (SnO) and oxygen ($O_2$), in cooling or chilling the said mixture, e.g. at about 700° C., in separating the solid stannous oxide from the oxygen, in performing a dismutation and separation of the solid stannous oxide into solid stannic oxide and liquid tin, e.g. at about 700° C., in recycling the stannic oxide, making the tin react with steam so as to form stannic oxide, which is recycled, and hydrogen ($H_2$), which is separated, and in recovering the hydrogen and oxygen produced.

Thus, as a result of a complex cycle of oxydation-reduction of tin, the steam is dissociated into hydrogen and oxygen.

As appears from the investigations performed, the economic advantages of the invention are considerable. This results in particular from the fact that the aforementioned cycle enables the high-potential calories in the core of the reactor to be used to the best. Furthermore, the production of large amounts of hydrogen and oxygen is economically highly interesting and capable of finding a great number of openings.

The invention also relates to a plant for the carrying out of the method of the invention, the said plant being remarkable notably in that it comprises at least one stannic-oxide melting chamber, the heat source of which is constituted by pipes through which liquid tin heated to a high temperature, e.g. about 1800° C., is made to flow in contact with a heat source such as a nuclear reactor, a cooling or chilling device such as water and steam exchangers placed in the path of the gaseous mixture of stannous oxide and oxygen resulting from the decomposition of the stannic oxide, a device for separating the oxygen from the solid stannous oxide, a device for separating the solid stannous oxide from the liquid tin produced by the dismutation of the stannous oxide, a reaction column for the decomposition of the steam by the tin, resulting in the formation of hydrogen and stannic oxide, and means for the recycling of the stannic oxide. The techniques used in such a plant are simple as compared with those used in an elaborate conventional cycle employing high-, medium- and low-pressure turbines, boilers with economizers, superheating and re-superheating, multiple exchangers, etc., some of these devices being operated at very high temperatures and pressures.

The invention will appear more clearly from the following description made with reference to the appended drawings illustrating, solely by way of example, one form of embodiment of the invention.

In the said drawings:

FIG. 1 is a diagrammatic view illustrating the method of the invention as a whole;

FIG. 2 is a more detailed and precise view of the equipment used for the carrying out of the tin oxydation-reduction cycle according to the invention;

FIG. 3 is a detailed view illustrating more specifically one of the devices shown in FIG. 2.

Reference is first made to FIG. 1 illustrating diagrammatically the method of the invention as applied to the use of the heat released in the core of a nuclear reactor to achieve the dissociation of water by using a tin oxydation-reduction cycle, and to simultaneously produce steam for driving an alternator.

The heat is extracted from the core of the reactor by means of a cooling circuit through which liquid tin is made to flow. The liquid tin flowing out from the nuclear reactor at 1820° C., enters, at 10, an exchanger for the heating of a stannic-oxide ($SnO_2$) melting chamber 11. The tin leaving the exchanger at 12 is conveyed back into the reactor at, for instance, 1750° C.

The stannic-oxide melting chamber 11 receives the stannic oxide from the water-dissociation column 13 and from the stannous-oxide (SnO) dismutation bunker 14.

The liquid stannic oxide heated in the melting chamber 11 to about 1700° C. decomposes spontaneously according to the endothermic reaction:

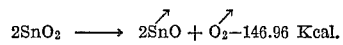
$$2SnO_2 \longrightarrow 2SnO + O_2 - 146.96 \text{ Kcal.}$$

The oxygen and gaseous stannous oxide heated to 1700° C. flow through the conduit 15. The gaseous mixture is cooled or chilled, for instance down to about 700° C., by entering into contact with an exchanger 16 fed with water at 17 and supplying steam at 18. Under this cooling action, the stannous oxide becomes solid and is separated from the oxygen, which is extracted from the plant at 19. The stannous oxide is deposited at 20 on the bottom of a bin 21, from which it is admtited into the bunker 14.

In the bunker 14, advantageously at about 700° C., occurs the dismutation of the tin according to the reaction:

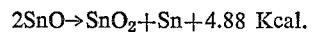
$$2SnO \rightarrow SnO_2 + Sn + 4.88 \text{ Kcal.}$$

The reaction is slightly exothermic, whereby the heat losses through the walls are substantially compensated for. At that temperature, the stannic oxide is solid whereas the tin is liquid. The separation of the tin from the stannic oxide is obtained simply by letting the stannic oxide roll and slide on an inclined grid 22. The liquid tin is collected in the lower portion 23 of the bin 14, whereas the stannic oxide is separated in the upper portion 24 of the bin and returns to the melting chamber 11.

The liquid tin extracted from the bin 14 is conveyed by a pump 25 into the upper portion of the water dissociation column 13 where it is atomized by an atomizer 26.

A counter-current flow of steam proceeding from the exchangers 16 is conveyed into the lower portion of the column 13 at 27.

In the column 13 occurs the reduction of the water according to the reaction:

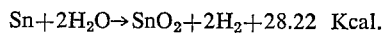

$$Sn + 2H_2O \rightarrow SnO_2 + 2H_2 + 28.22 \text{ Kcal.}$$

This reaction is slightly exothermic. The steam is supplied for instance at 250° C. and the tin at about 400° C. At the reaction temperature considered, the stannic oxide produced is solid and is collected at the bottom of the column in a bin 28 from which it is conveyed back into the melting chamber 11. The hydrogen produced is collected at 29. Advantageously, the steam introduced into the column 13 may be under pressure, so that the hydrogen produced is collected under pressure without the reduction reaction being substantially modified.

The steam produced in the exchanger 16 and unused during the process is taken out at 13 and may be used to supply a thermal power station of a conventional type.

It is thus obvious that, in the method just described, the dissociation of water into its components, namely oxygen and hydrogen, is performed by deriving the necessary heat from the core of the reactor. The reactor is thermodynamically interesting, for the high-temperature calories are used directly at their potential in the cycle. Moreover, the techniques required for the carrying out of the cycle give rise to no particular difficulties. In addition, any casual leakage of the heat-exchange fluid (tin) can by no means be detrimental to the process, since no foreign dangerous matter is introduced into the cycle.

Reference is now made to FIGS. 2 and 3 illustrating more specifically one form of embodiment of a plant according to the invention.

In FIG. 2, the nuclear reactor is shown at 31. The heat produced therein is withdrawn through a cooling circuit through which tin is conveyed. The tin 1820° C. leaves the reactor at 32 and is returned into the latter at 33 at a temperature of 1750° C. after exchanging heat with the plant.

At 34 is shown the main stannic-oxide melting chamber, which is annular in shape. In the latter are mounted heat-exchange pipes of the type used in "Field" boilers, or of the "glove-finger" type 35, which are licked externally by the liquid tin supplied through the conduit 32. After passing externally through the layers of pipes 35, the exchange fluid is conveyed back into the return conduit 33. An auxiliary stannic-oxide melting chamber 36, the function of which will be explained later, is also heated by "Field" pipes 37, also supplied through the circuit 32, 33.

The stannic oxide (SnO$_2$) melted in the chamber 34 at about 1700° C. decomposes, as already mentioned, into a gaseous mixture of stannous oxide and oxygen, which is collected and channeled in a central space of the plant, forming an annular chamber 38. This gaseous mixture is cooled or chilled by entering into contact with water or steam heat-exchangers 39 arranged annularly at the outlet of the chamber 38.

As a result of this cooling, the temperature of the product falls to about 700° C. in the external annular portion 40. The gaseous oxygen and the solid stannous oxide (SnO) are separated in cyclones 41. The oxygen is released in the upper portion of the plant at 42 after being collected in the annular conduit 43 closing the space 40.

The solid stannous oxide separated in the cyclones 41 is subjected to dismutation, i.e. is decomposed into solid stannic oxide and liquid tin at about 700° C. in the annular column 44. As appears more clearly from FIG. 3, the cyclones 41 let the solid stannous oxide flow on helical grids 45, under which the liquid tin is collected in gutters 46, whereas the stannic oxide is collected at the bottom of the grids 45 where it falls onto the bottom 47 of the column 44. There, the stannic oxide is liquified by a current of stannic oxide circulating as a result of overflow as shown by the arrows and proceeding from the melting chamber 34.

The whole of the equipment just described is located in a sealingly closed concrete enclosure 48.

The liquid tin collected at the bottom of the column 44 is conveyed through a circuit 50 and by means of a pump 51 to the top of a column 52 where it is atomized as shown diagrammatically at 53.

A counter-current flow of steam, e.g. at 250° C., produced by the exchangers 39 is conveyed into the bottom of the column 52 at 54.

In this column, which may be for instance under atmospheric pressure, the steam is reduced into hydrogen which is released at the top of the column, whereas the tin is oxidized into solid stannic oxide at that temperature and is deposited at the bottom of the column in a bin 55. This reduction may also be performed under pressure.

Therefrom, the stannic oxide falls into an auxiliary melting chamber 56 wherein the melting is performed through the medium of the melting chamber 36 and by means of overflow circulation between the two melting chambers 56 and 36, as illustrated by the arrows. The liquid stannic oxide is recycled, through the medium of a cyclone 57, at the bottom of the column 44.

A few orders of magnitude characterizing a plant of the type illustrated in FIGS. 2 and 3 are given hereinunder.

| | |
|---|---:|
| Thermal power of the nuclear reactor, mw. | 840 |
| Rate-of-flow of the heat-exchange fluid (Sn), m.³/s. | 8 |
| Rate-of-flow of the stannous oxide and the oxygen in chamber 38, m.³/s. | 1500 |
| Rate-of-flow of the solid stannous oxide at the cyclone, kg./s. | 170 |
| Oxygen output, Nm.³/h. | 50,000 |
| Rate-of-flow of the steam admitted into the column 53, t./h. | 90 |
| Hydrogen output from the column 52, Nm.³/h. | 100,000 |
| Rate-of-flow of liquid tin at the column 52, l./s. | 11 |
| Diameter of enclosure 48, m. | 20 |
| Height of enclosure 48, m. | 16 |
| Absolute pressure within enclosure 48, b. | 0.2 |
| Diameter of column 52, m. | 4 |
| Height of column 52, m. | 25 |
| Pressure in column 52, b. | 1 |
| Electric power of the alternator driven by the heat-power station supplied with steam by the exchangers 39, mw. | 180 |

Therefore, by means of such a plant and using a reactor whose thermal power is 840 mw., there is obtained, without using highly elaborate techniques, an electric power of 180 mw. and, simultaneously, 100,000 normal m.³ of hydrogen per hour and 50,000 normal m.³ of oxygen per hour.

From the foregoing it appears that the method according to the invention is highly advantageous from the economic and technical points of view and is an efficient solution for the recovery of high-potential thermal energy.

Of course, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. Method of recovery and conversion of high-temperature heat-energy dissipated in a nuclear reactor comprising the steps of using the high-temperature heat-energy released in the reactor to melt stannic oxide $$(SnO_2)$$

at about 1700° C., letting the latter decompose into a gaseous mixture of stannous oxide (SnO) and oxygen ($O_2$), in cooling or chilling the said mixture, separating the solid stannous oxide from the oxygen, performing a dismutation and separation of the solid stannous oxide into solid stannic oxide and liquid tin, recycling the stannic oxide, making the tin react with steam so as to form stannic oxide, which is recycled, and hydrogen ($H_2$), which is separated, and recovering the hydrogen and oxygen produced.

2. Method according to claim 1, wherein the high-temperature heat-exchange fluid used is liquid tin which cools the heat source.

3. Method according to claim 1, wherein said cooling of gaseous mixture of stannous oxide (SnO) and oxygen ($O_2$) is performed at about 700° C.

4. Method according to claim 1, wherein said dismutation and separation of stannic oxide and liquid tin is performed at about 700° C.

5. Method according to claim 3, wherein use is made, in order to "chill" the reaction of decomposition of the stannic oxide into stannous oxide and oxygen, of a water and steam heat-exchanger.

6. Method according to claim 1, wherein the various stages of the tin cycle are carried out under substantially atmospheric pressure or under a lower pressure.

7. Method according to claim 6, wherein the reduction of the steam by the tin is carried out under a pressure higher than atmospheric.

8. Plant for the recovery and conversion of high-temperature heat-energy dissipated in a nuclear reactor comprising at least one stannic-oxide ($SnO_2$) melting chamber, pipes through which is made to flow liquid tin heated to a temperature of about 1800° C. in contact with the hot source of said nuclear reactor, said pipes passing through said stannic-oxide melting chamber and forming its heat source, a space in which escapes the gaeous mixture of stannous oxide (SnO) and oxygen ($O_2$) resulting from the decomposition of stannic oxide ($SnO_2$), a cooling or chilling device such as water and steam exchangers placed in said space in the path of said gaseous mixture of stannous oxide and oxygen, a device for separating the oxygen from the solid stannous oxide resulting from said chilling of said gaseous mixture, a device for separating the solid stannic oxide from the liquid tin resulting from the spontaneous dismutation of the stannous oxide, a reaction column for the decomposition of the steam by the tin, resulting in the formation of hydrogen and stannic oxide, stannic-oxide recycling means, and means for feeding said column with steam and with the tin resulting from said dismutation of said stannous oxide.

9. Plant according to claim 8, wherein the devices for separating the oxygen and the stannous oxide comprise devices of the "cyclone" type.

10. Plant according to claim 8, wherein the devices for separating the stannous oxide and the tin are constituted by a grid-type separator comprising inclined grids on which the solid stannic oxide rolls and inclined surfaces or gutters on which flows the liquid tin dipping through the said grids.

11. Plant according to claim 8, wherein the column for the decomposition of the steam by the tin ends at its base with a gutter and receives the solid stannic oxide produced by the reaction, and the said gutter opens into a space into which is conveyed a flow of liquid stannic oxide heated by the said heat-exchange pipes through which flows the said liquid tin.

References Cited

UNITED STATES PATENTS

| | | | |
|---|---|---|---|
| 3,535,082 | 10/1970 | Nurnberg et al. | 423—657 |
| 3,155,547 | 11/1964 | Siebker | 176—39 |

FOREIGN PATENTS

| | | | |
|---|---|---|---|
| 1,109,652 | 4/1968 | Great Britain | 176—39 |

HARVEY E. BEHREND, Primary Examiner

U.S. Cl. X.R.

176—39, 92 B; 423—579, 618, 657